United States Patent [19]
Columbus

[11] 3,929,694
[45] Dec. 30, 1975

[54] CLEAR ADHESIVE APPLICATOR CRAYON COMPRISING AGAR AND POLYACRYLAMIDE

[75] Inventor: Peter Spiros Columbus, Whitestone, N.Y.

[73] Assignee: Borden, Inc., Columbus, Ohio

[22] Filed: Oct. 10, 1974

[21] Appl. No.: 513,684

Related U.S. Application Data

[63] Continuation-in-part of Ser. No. 447,153, March 1, 1974, which is a continuation-in-part of Ser. No. 348,357, April 5, 1973.

[52] U.S. Cl. ............... 260/17.4 ST; 260/17.4 SG
[51] Int. Cl. .................................... C08d 9/06
[58] Field of Search ............. 260/17.4 ST; 425/803

[56] References Cited
UNITED STATES PATENTS

| | | | |
|---|---|---|---|
| 502,163 | 7/1893 | Apple | 106/129 |
| 1,325,971 | 12/1919 | Akashi | 106/22 |
| 1,406,837 | 2/1922 | Fitzgerald | 106/25 |
| 2,525,804 | 8/1947 | Hossenlopp | 260/17.4 |
| 3,576,776 | 4/1971 | Muszik et al. | 260/22 |
| 3,669,688 | 6/1972 | Thompson | 99/139 |

OTHER PUBLICATIONS
Chem. Abst. 60:4296e, deVries, "Removable Colored Compositions".

Primary Examiner—Melvin Goldstein
Assistant Examiner—Edward Woodberry
Attorney, Agent, or Firm—George A. Kap; George P. Maskas; Daniel D. Mast

[57] ABSTRACT

An adhesive applicator crayon contains water, polyacrylamide and agar. The adhesive applicator crayon is preferably prepared by first dissolving a sufficient amount of agar, and polyacrylamide in hot water. The solution gels sufficiently upon cooling for use as an adhesive applicator crayon. The adhesive applicator crayon is particularly useful in that the adhesive film produced by its use is non-toxic, transparent, low in cost and easy to manufacture.

12 Claims, 2 Drawing Figures

CLEAR ADHESIVE APPLICATOR CRAYON COMPRISING AGAR AND POLYACRYLAMIDE

This application is a continuation-in-part of my copending application Ser. No. 447,153 filed Mar. 1, 1974 which is in turn a continuation-in-part of my copending application Ser. No. 348,357 filed Apr. 5, 1973.

BACKGROUND OF THE INVENTION

This invention pertains to an adhesive applicator crayon and to the process of making the solid adhesive which is the sole ingredient of such crayon.

The prior art adhesive applicator crayons which have found greatest commercial success are either soap gels, the soap of which acts as a release agent in the final adhesive bond; soap gels in water which result in hazy or opaque adhesive films and require relatively high sustained temperatures for processing and filling; or soap gels which are much more difficult to process than the adhesive of the present invention.

The prior art adhesive crayons are generally characterized by excessive foaming when agitated during processing and require sustained high temperatures throughout the processing and filling operatons. The prior art adhesive crayons also require costlier raw materials; the use of costlier plastic containers that will not deform when subjected to elevated temperatures on filling; in some cases contain flammable organic solvents resulting in hazards of fire and polluting fumes during processing, filling and while being used by small children; contain fatty acid soaps which could cause irritation in the digestive tract and sensitive tissue of the eye, especially when improperly used by small children; and in many instances, are too soft in warm weather.

SUMMARY OF THE INVENTION

In accordance with this invention, there is provided an adhesive applicator crayon comprising on a 100 part basis of total ingredients in the crayon from about 0.5 to about 5.0 parts of agar, about 60 to 95 parts of water and about 0.5 to 36.0 parts of polyacrylamide having a molecular weight of about 50,000 to about 10,000,000. This polyacrylamide generally contains from 0.5 to 30.0 parts of one polyacrylamide component having a molecular weight of from 50,000 to 800,000 and about 0.25 to 6.0 parts of a second polyacrylamide component having a molecular weight of from about 800,000 to 10,000,000.

The above enumerated deficiences of the prior art are overcome in whole or in part by the adhesive applicator crayon of the present invention. The adhesive of the present invention does not create a fire or explosion problem in either the molten or solid state. The adhesive can also be left in an open applicator for a prolonged period without drying out. The problems related to gelation in processing equipment are reduced considerably and the adhesive film created by the use of the product can be clear and colorless. The adhesive also sets faster than prior art crayon based adhesives. The surface tension of the polyacrylamide of the present invention in water solution is relatively high thus facilitating removal from the mixing tank for packaging purposes. The relatively low temperature processibility of the compositions of the present invention also contribute another significant plus, that is, that the quantity of fumes generated is much lower in magnitude than the quantity of fumes generated in the manufacture of the commercial prior art adhesive applicator crayons. This is due, to a large degree, to the unique properties of the agar gelling agent as described above. The gelling component is initially dissolved at about 90°C. but once dissolved does not solidify until the temperature is brought down to 40°C. or below. However, to liquify the gelled adhesive crayon, temperatures of 80°C. to 90°C. are required. This provides an adhesive applicator crayon which is solid throughout the normal temperatures found in its use but yet can be processed and filled using temperatures much lower than required for initial dissolving i.e. down to 40°C. The dimensional stability lubricity and the tensile strength of the adhesive of the present invention are also sufficient to allow the adhesive to be used in a propel-repel lipstick type container and prevent crumbling when used. This adhesive crayon spreads easily when applied on a substrate by rubbing.

FIG. 1 is a front view of the adhesive crayon of the present invention in a propel-repel lipstick type applicator, with the top of the applicator removed and positioned above the applicator. The applicator is the propel configuration. Some of the adhesive is exposed above the tube of the applicator.

FIG. 2 is a cross-sectional view of the adhesive crayon positioned in the applicator in the repel configuration, the adhesive being withdrawn below the applicator tube.

DESCRIPTION OF THE PREFERRED EMBODIMENTS

Figure 1:
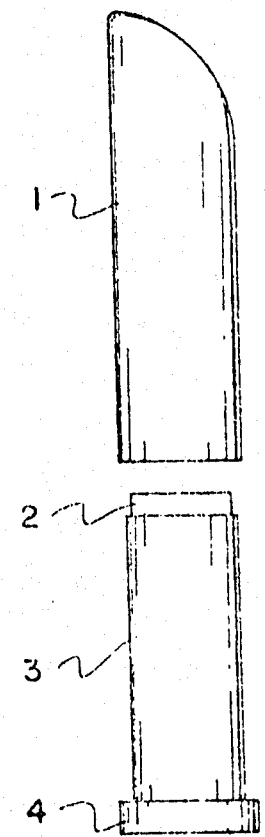
Figure 2:
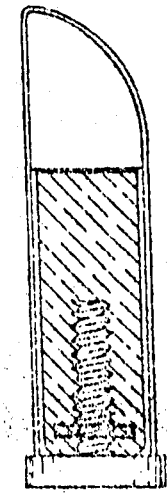
Figure 1:
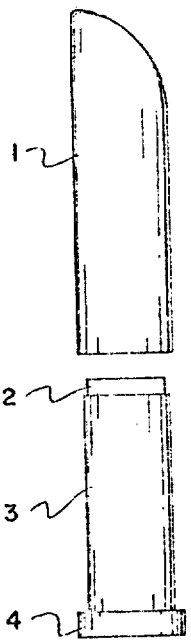
Figure 2:

In the preferred embodiments of the invention, the amount of agar is from about 2.0 to about 3.0 parts and the amount of water is from about 80 to 90 parts. The preferred polyacrylamide is a mixture of two polyacrylamides, one of which has a low molecular weight and one of which has a high molecular weight. The low molecular weight polyacrylamide is present preferably at a level of from 5.0 to 10.0 parts. The low molecular weight has a molecular weight range of from about 100,000 to 800,000 most preferably 100,000 to 300,000. The high molecular weight has a molecular weight range of from about 800,000 to 10 million, most preferably 4 million to 7 million and is preferably present at a level of from about 2.0 to 4.0 parts. As more of one is present, less of the other is required. It is also preferred that there be a difference of at least one million between the molecular weight of the two acrylamide components.

The RVF Broodfield Viscosity of the mixture prior to gelling at 80°C. using a number 7 spindle at 20 r.p.m. is preferably between 10,000 and 50,000 cps.

Agar is the dried amorphous non-nitrogeneous extract from Gelidium and other red algae being the sulphuric acid ester of a linear galactan. Gelation of an agar solution occurs at a temperature relatively far below the gel melting temperature. This high hysteresis allows for filling plactic tubes with dextrine adhesive containing agar at relatively lower temperatures. On gelling, a temperature of close to 90°C. is necessary to reliquify the material. This insures adequate dimensional stability and solidification at elevated temperatures encountered during shipment and use in warmer areas. In addition, its gels have strength, elasticity permanence and are relatively transparent.

The polyacrylamide which constitutes the adhesive component can be acrylamide or methacrylamide homopolymer or any of the known copolymers of polyacrylamide or polymethacrylamide so long as the non-acrylamide component of the copolymer does not deleteriously effect the properties of the adhesive. Preferably a 1 % aqueous solution of the polyacrylamide has a pH of less than 7.0 although a polyacrylamide with a pH of 7.0 or greater is also operable.

The low molecular weight polyacrylamide preferably contains from about 5 to 20% of copolymerized acrylic acid monomer. This aids in adhesion, increases the amount of adhesive component which can be added and decreases the gel time.

The high molecular weight acrylamide which provides strength and adhesion to the composition preferably contains from 0 to about 1% of carboxyl content. The strength is necessary so that the adhesive applicator crayon can be packaged in a propel-repel lipstick type applicator such as is shown in the drawings. In the drawings, the cap shown at 1 has a flat curved top for the purpose of applying pressure to objects being adhered. The adhesive is shown at 2, the applicator barrel at 3 and the base at 4. Other known sealable container applicators can also be used.

It is also preferable to have present a humectant or hydroscopic agent which also acts as a plasticizer. The humectant is present at a level of from about 0.1 to about 5.0 parts. The function of the humectant is to prevent the adhesive crayon from drying out in normal storage and also to plasticize the adhesive film which is formed in the use of the adhesive crayon. The most preferred humectant-plasticizer is propylene glycol and the propylene glycol is preferably present at from about 0.5 to about 1.5 parts. Other humectant plasticizers included polyhydric alcohols such as sorbitol, esters of sorbitol, ethylene glycol, glycerol, diethylene glycol, pentaerythritol, dipentaerythritol, water soluble polyether glycols and mixtures thereof. The polyether glycols can be polyethylene glycol, polypropylene glycol, polyethylenepolypropylene glycol or any of the other well-known polyether glycols. Also sugars such as glucose, sucrose and invert sugars can be used. Inorganic and also organic salts such as calcium chloride and ammonium thiocyanate as well as other hydroscopic materials such as urea can be used. Mixtures of the above can also be used.

In view of the fact that the adhesive applicator crayon will undoubtedly come into the hands of small children, the preferred humectant plasticizers are the non-toxic ones. This is in keeping with the other above described non-toxic ones components of the adhesive applicator crayon.

It is also preferable that the adhesive applicator crayon contain from about 0.1 to about 1.0 parts of a preservative. The preservative can be any of those conventionally used in starch paste adhesive compositions. These materials are generally known in the art and will not be described in detail here. In passing, it should be noted here, however, that phenol and benzoic acids are quite operable and that a mixture of the two is most preferred. Other preservatives which can be used include ethyl-para-hydroxybenzoate, methyl-para-hydroxybenzoate and sorbic acid. Adhesive promoters can also be added but, since the adhesive of the present invention provides a bond resulting in fiber separation in both wood and paper, adhesion promoters are not necessary. Water miscible solvents, such as alcohols and ketones, can also be added but are not recommended because of the toxicity to small children, danger of fire and explosion, etc. Known fillers, dyes and pigments can also be added, if desired, to reduce cost or for aesthetic purposes. Plasticizers such as polypropylene glycol, the tridecyl alcohol adduct of ethylene oxide and the sorbitan monoleate adduct of ethylene oxide, can also be used.

Other compatible adhesive substances can also be incorporated into the adhesive stick of the present invention. Examples of other adhesive substances include starch based adhesives such as corn and potato starches and dextrines or polyvinyl acetate dispersions in water.

The process employed for the manufacture of the inventive applicator crayon of the present invention comprises:

A. mixing from about 0.5 to about 5.0 parts of agar, about 60 to 95 parts of water and about 0.5 to 36.0 parts of a polyacrylamide having a molecular weight of from about 50,000 to 10,000,000;

B. heating the mixture to a temperature of about 90°C.;

C. cooling the mixture to below 90°C. but above 40°C;

D. agitating the heated mixture; and

E. casting the mixture at a temperature above 40°C. into the form of a crayon; and F. cooling the cast mixture to below 40°C. to solidify the crayon.

The following examples are illustrative of the practice of the invention. They are, however, not to be deemed limitative in any manner.

The polyacrylamides used in the following examples are available from American Cyanamid Company, Process Chemicals Department, Wayne, N.J. 07470. CYANAMER P26 polyacrylamide is a modified polyacrylamide having a molecular weight of approximately 200,000 and a carboxyl content of about 8% to 10%. CYANAMER P250 polyacrylamide is a homopolymer of acrylamide having a molecular weight of approximately 5,000,000 to 6,000,000. It is essentially non-toxic. The surface tension of CYANAMER P26 polyacrylamide in 0.5% solution in water is 61.1 dynes per centimeter. The surface tension of CYANAMER P250 in a 0.5% water solution is 75.5 dynes per centimeter.

The white potato dextrine referred to in one of the following examples is a high viscosity, superior white potato dextrine, which is supplied as a fine white powder with a cold water solubility at 20°C. of 15–20%, and a viscosity of 75 cSt. of a solution of 20g of dextrine, 30g of water and 9cc NaOh-solution 4N, measured at 25°C. in an Ostwald viscosimeter. The dextrine has a pH of 2.2 at a solids content of 34.8%. The dextrine is commercially available as dextrine TBW-2 from W.A. Scholten's Chemische Fabricken N.V., Foxhol (GR) Holland.

Parts in the following examples, as elsewhere in the specification, refer to parts by weight, unless otherwise stated. Parts, as referred to in the adhesive stick, total to 100 parts of total ingredients per 100 parts by weight of the adhesive stick. Molecular weight, as referred to in the examples as elsewhere in the specification, refers to weight average molecular weight.

EXAMPLE 1

To a clean stainless steel jacketed kettle with an agitator, add 85.7 parts of water, then add 2.5 parts of agar, 3.0 parts of CYANAMER P250 and 7.5 parts of CYANAMER P26. The mixture is mixed cold for one hour with medium agitation. Heat the mixture to 92°C. and add 0.3 parts of benzoic acid slowly with medium agitation. Hold the mixture at this temperature with agitation for approximately one hour or until the mixture is smooth and homogeneous. Then add 1.0 part of propylene glycol with agitation and continue agitation for twenty minutes.

Stop the agitation and allow approximately one and one-half hours for the foam to rise to the surface maintaining the temperature at 77°C. The mixture should now be free of bubbles. The mixture is then drawn off and filtered through a 100 mesh stainless steel screen and transferred through heated stainless steel tubing to the filling equipment. The filling equipment which is jacketed stainless steel is used to fill plastic containers in which the adhesive is to be used. The RVF Brookfield Viscosity of the mixture at 80°C. using a number 7 spindle at 20 r.p.m. was 26,000 cps.

The containers are then capped after filling to prevent evaporation and drying of the solid adhesive. The containers are maintained at room temperature for a day to allow the mixture to achieve proper firmness before shipping.

The adhesive applicator crayons prepared by the above procedure are excellent in their performance yielding clear films of adhesive which have good adhesion to paper and other porous substrates. The crayon is orally and dermally non-toxic and non-irritating to the skin and sensitive tissues of the eye.

EXAMPLE 2

To a clean stainless steel jacketed kettle with an agitator, add 79.7 parts of water, then add 2.0 parts of agar, 2.0 parts of Cyanamer P250 and 15.0 parts of Cyanamer P26. The mixture is mixed cold for one hour with medium agitation. Heat the mixture to 92 C. and add 0.3 parts of benzoic acid slowly with medium agitation. Hold the mixture at this temperature with agitation for approximately one hour or until the mixture is smooth and homogeneous. Then add 1.0 part of Glycerol with agitation and continue agitation for twenty minutes.

Stop the agitation and allow approximately one and one half hours for the foam to rise to the surface, maintaining the temperature at 77°C. The mixture should now be free of bubbles. The mixture is then drawn off and filtered through a 100 mesh stainless steel screen and transferred through heated stainless steel tubing to the filling equipment. The filling equipment which is jacketed stainless steel is used to fill plastic containers in which the adhesive is to be used.

The containers are then capped after filling to prevent evaporation and drying of the solid adhesive. The containers are maintained at room temperature for a day to allow the mixture to achieve proper firmness before shipping.

The adhesive applicator crayons prepared by the above procedure are excellent in their performance yielding clear films of adhesive which have good adhesion to paper and other porous substrates.

EXAMPLE 3

To a clean stainless steel jacketed kettle with an agitator, add 85.2 parts of water, then add 2.7 parts of agar, 3.5 parts of Cyanamer P250 and 7.5 parts of Cyanamer P26. The mixture is mixed cold for one hour with medium agitation. Heat the mixture to 92°C. and add 0.3 parts of benzoic acid slowly with medium agitation. Hold the mixture at this temperature with agitation for approximately one hour or until the mixture is smooth and homogeneous. Then add 1.0 part of propylene glycol with agitation and continue agitation for twenty minutes.

Stop the agitation and allow approximately one and one half hours for the foam to rise to the surface, maintaining the temperature at 77°C. The mixture should now be free of bubbles. The mixture is then drawn off and filtered through a 100 mesh stainless steel screen and transferred through heated stainless steel tubing to the filling equipment. The filling equipment which is jacketed stainless steel is used to fill plastic containers in which the adhesive is to be used.

The containers are then capped after filling to prevent evaporation and drying of the solid adhesive. The containers are maintained at room temperature for a day to allow the mixture to achieve proper firmness before shipping.

The adhesive applicator crayons prepared by the above procedure are excellent in their performance yielding clear films of adhesive which have good adhesion to paper and other porous substrates.

EXAMPLE 4

To a clean stainless steel jacketed kettle with an agitator, add 81.2 parts of water, then add 2.5 parts of agar, 3.0 parts of Cyanamer P250, 2.0 parts of Cyanamer P26, and 10.0 parts of dextrine. The mixture is mixed cold for one hour with medium agitation. Heat the mixture to 92°C. and add 0.3 parts of benzoic acid slowly with medium agitation. Hold the mixture at this temperature with agitation for approximately one hour or until the mixture is smooth and homogeneous. Then add 1.0 part of propylene glycol with agitation and continue agitation for twenty minutes.

Stop the agitation and allow approximately one and one half hours for the foam to rise to the surface, maintaining the temperature at 77°C. The mixture should now be free of bubbles. The mixture is then drawn off and filtered through a 100 mesh stainless steel screen and transferred through heated stainless steel tubing to the filling equipment. The filling equipment which is jacketed stainless steel is used to fill plastic containers in which the adhesive is to be used.

The containers are then capped after filling to prevent evaporation and drying of the solid adhesive. The containers are maintained at room temperature for a day to allow the mixture to achieve proper firmness before shipping.

The adhesive applicator crayons prepared by the above procedure are excellent in their performance yielding clear films of adhesive which have good adhesion to paper and other porous substrates.

EXAMPLE 5

To a clean stainless steel jacketed kettle with an agitator, add 82.2 parts of water, then add 2.5 parts of agar, 3.0 parts of Cyanamer P250 and 7.0 parts of Cyanamer P26. The mixture is mixed cold for one hour with medium agitation. Heat the mixture to 92°C. and add 0.3 parts of benzoic acid slowly with medium agitation. Hold the mixture at this temperature with agitation for approximately one hour or until the mixture is smooth and homogeneous. Lower temperature to 80°C, then add 1.0 part of propylene glycol and 4.0 parts of apolyvinyl acetate dispersion (55%) in water with agitation and continue agitation for twenty minutes.

Stop the agitation and allow approximately one and one half hours for the foam to rise to the surface, maintaining the temperature at 77°C. The mixture should now be free of bubbles. The mixture is then drawn off and filtered through a 100 mesh stainless steel screen and transferred through heated stainless steel tubing to the filling equipment. The filling equipment which is jacketed stainless steel is used to fill plastic containers in which the adhesive is to be used.

The containers are then capped after filling to prevent evaporation and drying out of the solid adhesive. The containers are maintained at room temperature for a day to allow the mixture to achieve proper firmness before shipping.

The adhesive applicator crayons prepared by the above procedure are excellent in their performance yielding clear films of adhesive which have good adhesion to paper and other porous substrates.

What I claim is:

1. A solid adhesive applicator crayon comprising from about 0.5 to about 5.0 parts of agar, about 60 to 95 parts of water and about 0.5 to 36.0 parts of polyacrylamide having a molecular weight of from about 50,000 to 10,000,000.

2. The solid adhesive applicator crayon of claim 1 wherein the polyacrylamide is a mixture of two polyacrylamides, one having a low molecular weight of from about 50,000 to 800,000 and is present at a level of about 0.5 to 30.0 parts and the second having a high molecular weight of 800,000 to 10,000,000 and is present at a level of from about 0.25 to 6.0 parts.

3. The solid adhesive applicator crayon of claim 2 wherein there is a difference in molecular weight of at least one million between the weight of one polyacrylamide and the second polyacrylamide.

4. The solid adhesive applicator crayon of claim 1 wherein the amount of agar is about 2.0 to 3.0 parts, the amount of water is from about 80 to 90 parts, the polyacrylamide comprises 5.0 to 10.0 parts of the one poly-acrylamide having a molecular weight of from about 100,000 to 300,000 and 2.0 to 4.0 parts of the second polyacrylamide having a molecular weight of 4 million to 7 million.

5. The solid adhesive applicator crayon of claim 1 containing from about 0.1 to about 5.0 parts of a humectant.

6. The solid adhesive applicator crayon of claim 1 containing from 0.1 to 1.0 parts of a preservative.

7. A process for the manufacture of a solid adhesive applicator crayon which comprises:
   A. mixing from about 0.5 to about 5.0 parts of agar, about 60 to 95 parts of water and about 0.5 to 36.0 parts of a polyacrylamide having a molecular weight of from about 50,000 to 10,000,000;
   B. heating the mixture to a temperature of about 90°C. but below its boiling point;
   C. cooling the mixture to below 90°C. but above 40°C;
   D. casting the mixture at a temperature above 40°C. into the form of a crayon; and
   E. cooling the cast mixture to below 40°C. to solidify the crayon.

8. The method of claim 7 wherein the polyacrylamide is a mixture of two polyacrylamides, one having a low molecular weight of from about 50,000 to 800,000 and is present at a level of about 0.5 to 30.0 parts and the second having a high molecular weight of 800,000 to 10,000,000 and is present at a level of from about 0.25 to 6.0 parts.

9. A propel-repel type solid adhesive applicator having a cap which seals the propel-repel applicator when not in use and a solid adhesive crayon positioned therein, said crayon comprising from about 0.5 to about 5.0 parts of agar, about 60 to 95 parts of water and about 0.5 to 36.0 parts of polyacrylamide having a molecular weight of from about 50,000 to 10,000,000.

10. The solid adhesive crayon of claim 9 wherein the polyacrylamide is a mixture of two polyacrylamides, one having a low molecular weight of from about 50,000 to 800,000 and is present at a level of about 0.5 to 30.0 parts and the second having a high molecular weight of 800,000 to 10,000,000 and is present at a level of from about 0.25 to 6.0 parts.

11. The solid adhesive crayon of claim 10 wherein there is a difference in molecular weight of at least one million between the molecular weight of one polyacrylamide and the second polyacrylamide.

12. The solid adhesive crayon of claim 9 containing from about 0.10 to about 5.0 parts of a humectant.

* * * * *

UNITED STATES PATENT OFFICE
CERTIFICATE OF CORRECTION

Patent No. 3,929,694  Dated December 30, 1975

Inventor(s) Peter Spiros Columbus        Page 1 of 2

It is certified that error appears in the above-identified patent and that said Letters Patent are hereby corrected as shown below:

Cancel the drawing sheet headed by Patent No. 3,930,694, and insert the sheet of drawing for Patent No. 3,929,694, as shown on the attached sheet.

Signed and Sealed this twenty-ninth Day of June 1976

[SEAL]

Attest:

RUTH C. MASON
Attesting Officer

C. MARSHALL DANN
Commissioner of Patents and Trademarks